(12) United States Patent
Kovacs

(10) Patent No.: US 11,773,908 B1
(45) Date of Patent: Oct. 3, 2023

(54) ARCUATE ELECTRICALLY CONDUCTIVE ASSEMBLY FOR BEARINGS

(71) Applicant: AKTIEBOLAGET SKF, Gothenburg (SE)

(72) Inventor: Gene A Kovacs, Brighton, MI (US)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 17/841,978

(22) Filed: Jun. 16, 2022

Related U.S. Application Data

(60) Provisional application No. 63/346,966, filed on May 30, 2022.

(51) Int. Cl.
  *F16C 19/52* (2006.01)
  *F16C 41/00* (2006.01)
  *F16C 19/14* (2006.01)

(52) U.S. Cl.
  CPC ............ *F16C 41/002* (2013.01); *F16C 19/14* (2013.01); *F16C 19/52* (2013.01)

(58) Field of Classification Search
  CPC .......... F16C 19/06; F16C 19/14; F16C 19/52; F16C 41/002
  See application file for complete search history.

(56) References Cited

U.S. PATENT DOCUMENTS

| | | | |
|---|---|---|---|
| 3,271,723 A * | 9/1966 | Willing | ................. F16C 41/002 439/17 |
| 3,757,164 A | 9/1973 | Binkowski | |
| 5,812,908 A | 9/1998 | Larocca et al. | |
| 7,339,777 B2 * | 3/2008 | Barnard | ................. H01R 39/64 361/212 |
| 8,169,766 B2 | 5/2012 | Oh et al. | |
| 9,464,672 B2 | 10/2016 | White | |
| 10,253,818 B1 | 4/2019 | Ince et al. | |
| 11,309,775 B2 | 4/2022 | Hubert et al. | |
| 2021/0293279 A1 | 9/2021 | Hubert et al. | |
| 2021/0310518 A1 | 10/2021 | Berruet et al. | |

(Continued)

FOREIGN PATENT DOCUMENTS

| | | | | |
|---|---|---|---|---|
| JP | 11218143 A | * | 8/1999 | .......... F16C 33/7846 |
| JP | 2002295492 A | * | 10/2002 | ............ F16C 33/723 |

(Continued)

*Primary Examiner* — Phillip A Johnson
(74) *Attorney, Agent, or Firm* — J-TEK LAW PLLC; Scott T. Wakeman; Mark A. Ussai

(57) ABSTRACT

An electrically conductive assembly prevents current flow through the raceways of a bearing disposed about a shaft and an outer ring disposed and within a bore of an outer member. An arcuate conductor has a centerline, an inner radial end engageable with the shaft or a bearing inner ring, an outer radial end and two circumferential ends spaced circumferentially apart such that an arcuate gap is defined between the two ends when the conductor is installed about the shaft or the bearing inner ring. The two circumferential ends define a gap angle about the centerline, the gap angle having a value of at least thirty degrees. At least one conductive coupler is configured to attach the conductor to the outer member, another member or the bearing outer ring such that an electrically conductive path extends through the conductor and the at least one coupler.

20 Claims, 12 Drawing Sheets

(56) References Cited

U.S. PATENT DOCUMENTS

2021/0310520 A1    10/2021   Arnault et al.
2021/0364040 A1    11/2021   Arnault et al.
2021/0364041 A1    11/2021   Berruet et al.

FOREIGN PATENT DOCUMENTS

JP          3654921 B2  *  6/2005   .............. F16C 19/52
JP        2009243695 A  *  10/2009

* cited by examiner

ARCUATE ELECTRICALLY CONDUCTIVE ASSEMBLY FOR BEARINGS

CROSS-REFERENCE

This application claims priority to U.S. Provisional Patent Application No. 63/346,966 filed on May 30, 2022, the entire contents of which are fully incorporated herein by reference.

BACKGROUND OF THE INVENTION

The present invention relates to bearings, and more particularly to grounding devices for preventing electric current or charge from passing through a bearing.

Bearings used in electrical machinery, such as motors, generators and similar devices, may be damaged if electric current or charge passes through the bearing, which is particularly harmful to the bearing raceways. Devices such as grounding brushes have been developed to provide an alternative path for current and thereby prevent such current from passing through the bearing. These devices often include a plurality of conductive fibers spaced circumferentially about the entire outer surface of the shaft to form a relatively solid ring of fibers, such that current passes through the fibers between the shaft and the housing. Other devices or mechanisms are provided to electrically insulate the bearing in order to prevent current from passing through the bearing and may include insulative coatings or coverings.

SUMMARY OF THE INVENTION

In one aspect, the present invention is an electrically conductive assembly for preventing current flow through the raceways of a bearing having an inner ring disposed about a shaft and an outer ring disposed within a bore of an outer member, the shaft or the outer member being rotatable about a central axis through the shaft. The conductive assembly comprises an arcuate conductor having a centerline, an inner radial end engageable with the shaft or the bearing inner ring, an outer radial end and two circumferential ends spaced circumferentially apart such that an arcuate gap is defined between the two ends when the conductor is installed about the shaft or the bearing inner ring. The two circumferential ends define a gap angle about the centerline, the gap angle having a value of at least thirty degrees. At least one conductive coupler is configured to attach the conductor to the outer member, another member or the bearing outer ring such that an electrically conductive path extends through the conductor and the at least one coupler.

In another aspect, the present invention is again an electrically conductive assembly as described in the preceding paragraph and further in which the conductor is an arcuate conductor having a centerline and including an arcuate conductive retainer. The retainer has an outer base wall and a pair of sidewalls extending radially inwardly from the base wall so as to define an arcuate channel and two circumferential ends spaced circumferentially apart such that an arcuate gap is defined between the two ends. The two circumferential ends of the retainer define a gap angle about the centerline, the gap angle having a value of at least thirty degrees. Further, a plurality of conductive fibers are spaced circumferentially about the centerline, each fiber having an outer radial end disposed within the channel of the retainer and at least one inner radial end engageable with the shaft or the bearing inner ring.

In a further aspect, the present invention is again an electrically conductive assembly as described in the preceding paragraph and further in which the at least one conductive coupler includes an arcuate plate having two circumferential ends, the two circumferential ends being spaced circumferentially apart so as to define an outer arcuate clearance gap spaced radially outwardly from and continuous with the arcuate gap defined between the circumferential ends of the conductor. The two circumferential ends of the arcuate plate define an outer gap angle about the central axis, the outer gap angle having a value of at least thirty degrees. The conductive arcuate plate has at least one mounting lug attachable to the outer member, another member or the bearing outer ring, so as to couple the conductive assembly thereto. Further, the arcuate retainer of the conductor is attached to the coupler arcuate plate such that a conductive path extends through the conductor and the conductive coupler.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIG. 3, are each an axial cross-sectional view of a second construction conductive assembly, shown mounted to a bearing outer ring in FIG. 3A and mounted to an outer member in FIG. 3B;

DETAILED DESCRIPTION OF THE INVENTION

Figure 1:
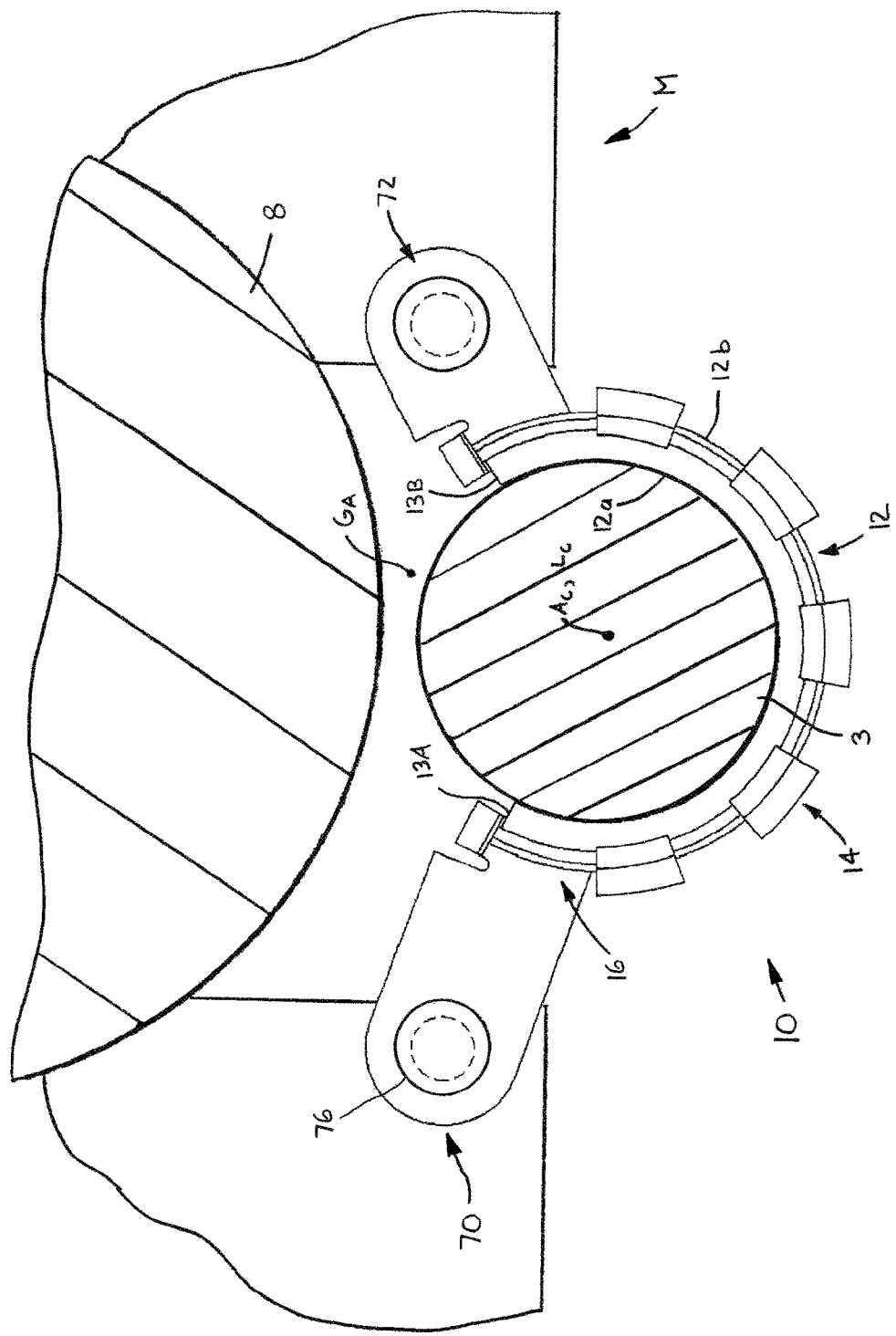
FIG. 1 is a front plan view of a first construction of a conductive assembly in accordance with the present invention, shown disposed about a shaft and connected with machine components.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-14 an electrically conductive assembly 10 for preventing current flow through the raceways $R_I$, $R_O$ of a bearing 1. The bearing 1 has an inner ring 2 disposed about a shaft 3, an outer ring 4 disposed within a bore 5 of an outer member 6 (e.g., a housing) and a plurality of rolling elements 7. The rolling elements 7 each roll simultaneously upon the raceways $R_I$, $R_O$ to rotatably couple the bearing rings 2, 4. The shaft 3 or the outer member 6 is rotatable about a central axis Ac through the shaft 3, and the bearing 1, and the shaft 3 and the outer member 6 are all components of a motor or other electrical machine M (e.g., a generator) or any other machine having rotatable components likely to accumulate electric charge or convey electric current. In any case, the conductive assembly 10 basically comprises an arcuate conductor 12, which is engageable with the shaft 3 or the bearing outer ring 4 and provides an arcuate gap $G_A$, and at least one conductive coupler 14 configured to connect the conductor 12 with the outer member 6, another member 8 (i.e., a proximal component or assembly of the machine M) or the bearing outer ring 4. As such, the conductive assembly 10 provides an electrically conductive path or paths extending between the shaft 3 and the outer member 6, or between the shaft 3 and the other member 8 of the machine M, through the conductor 12 and the at least one coupler 14, so as to divert electric charge or current from flowing through the raceways $R_I$, $R_O$ and thereby prevent damage to both the raceways $R_I$, $R_O$ and the rolling elements 7.

Figure 2:
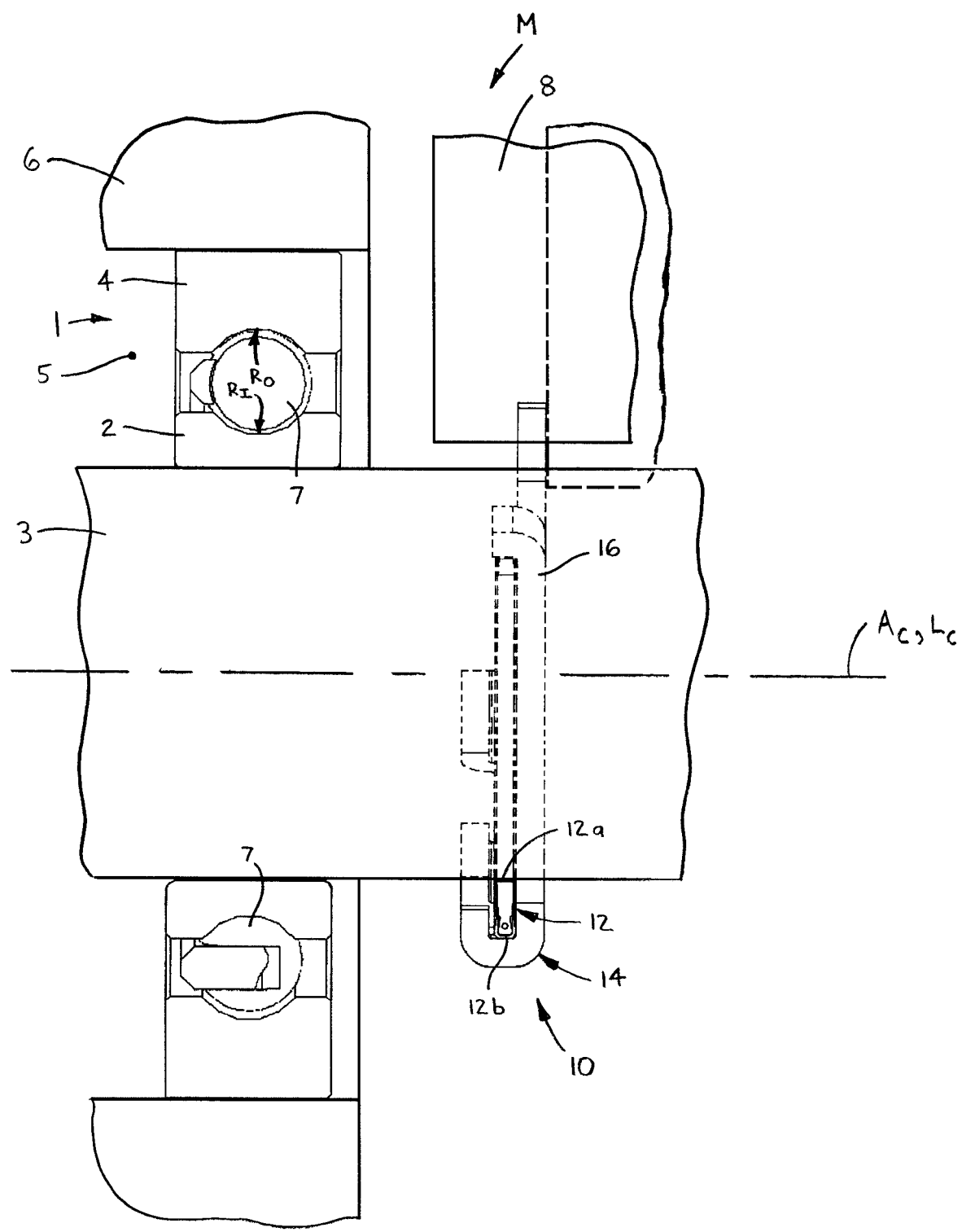
FIG. 2 is an axial cross-sectional view of the first construction conductive assembly, shown spaced from a bearing and mounted to another member of an electric machine.
Figure 3A:
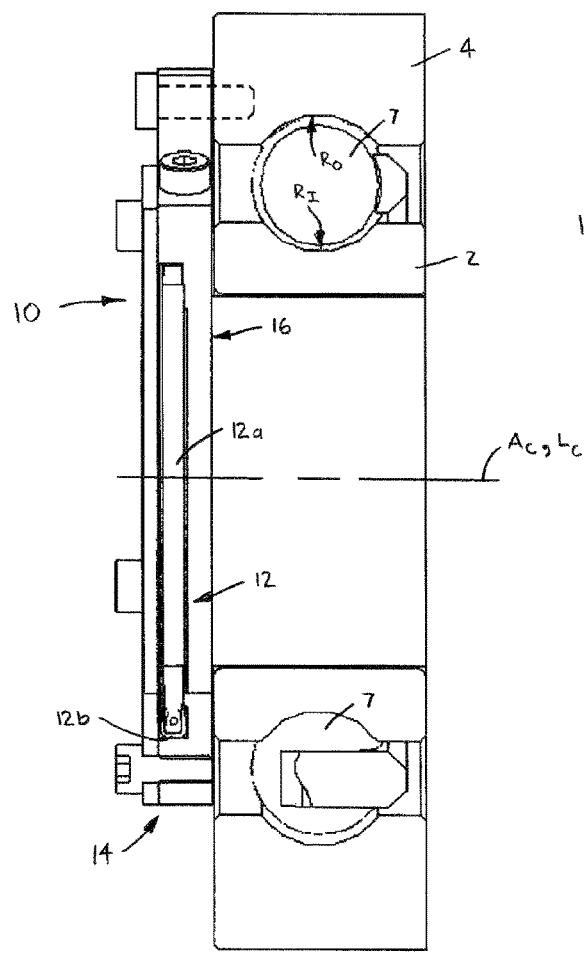
FIGS. 3A and 3B, collectively
Figure 3B:
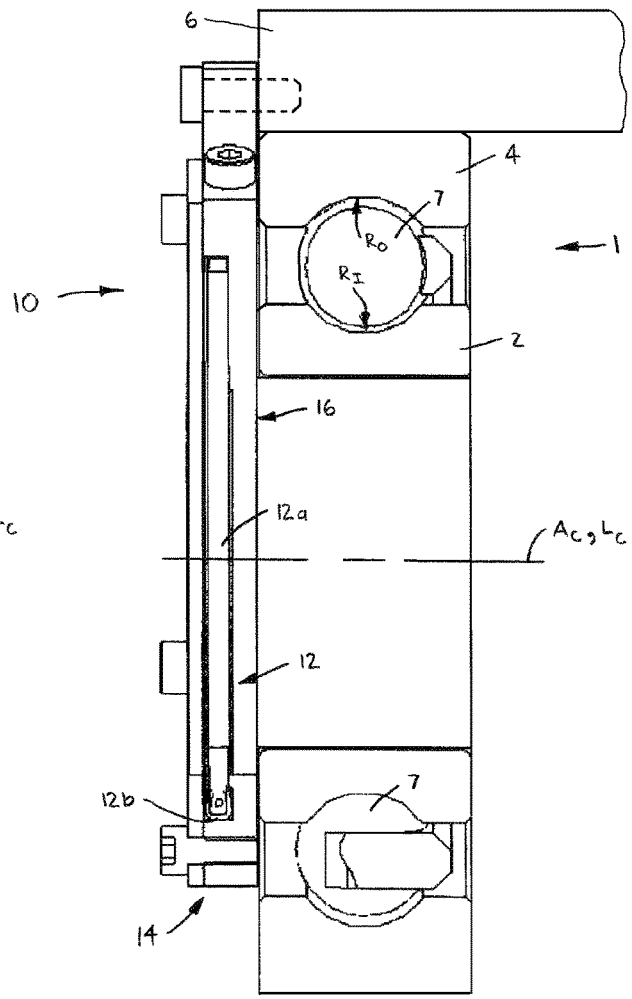
Figure 4:
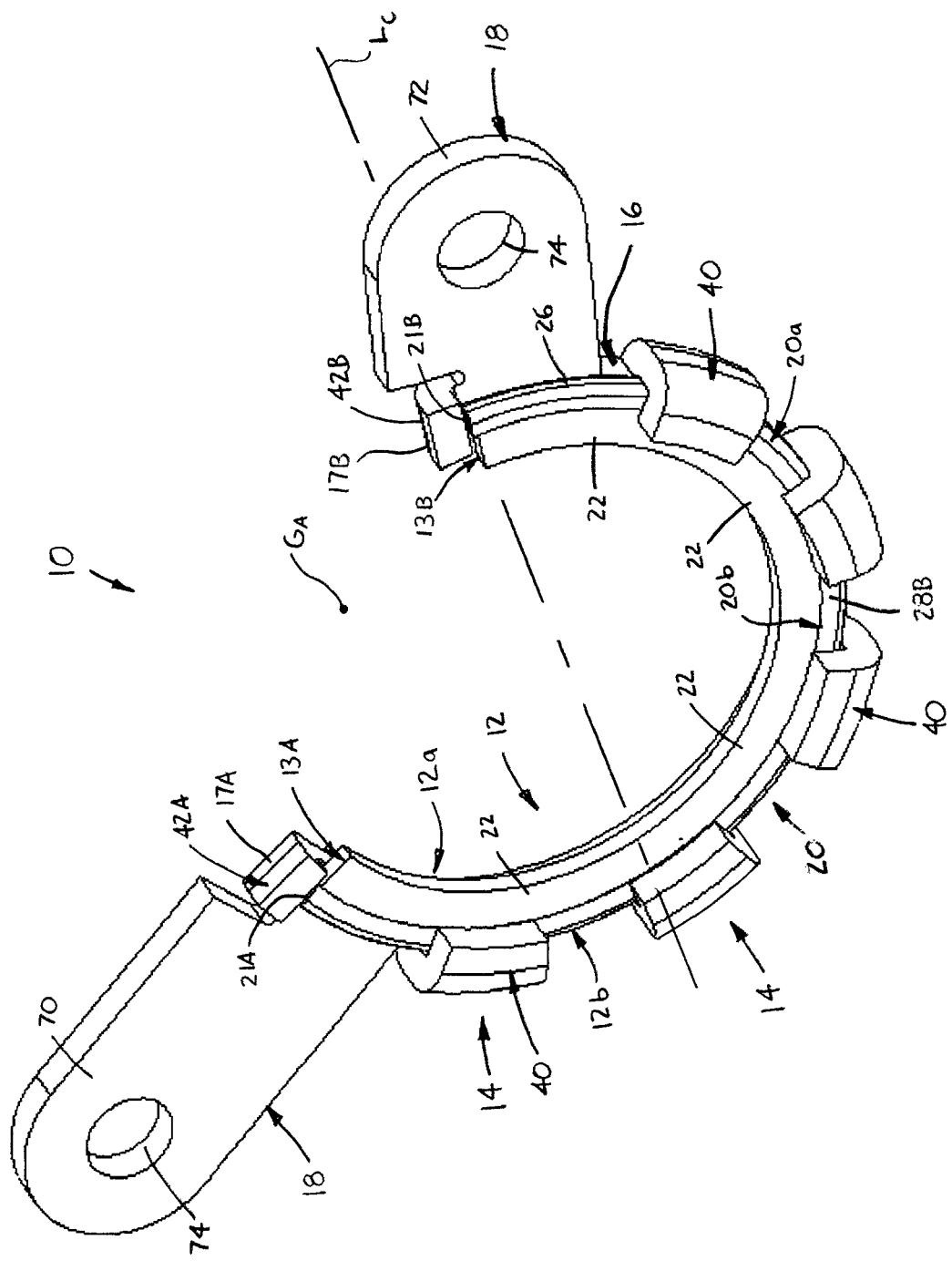
FIG. 4 is a perspective view of the first construction conductive assembly.
Figure 5:
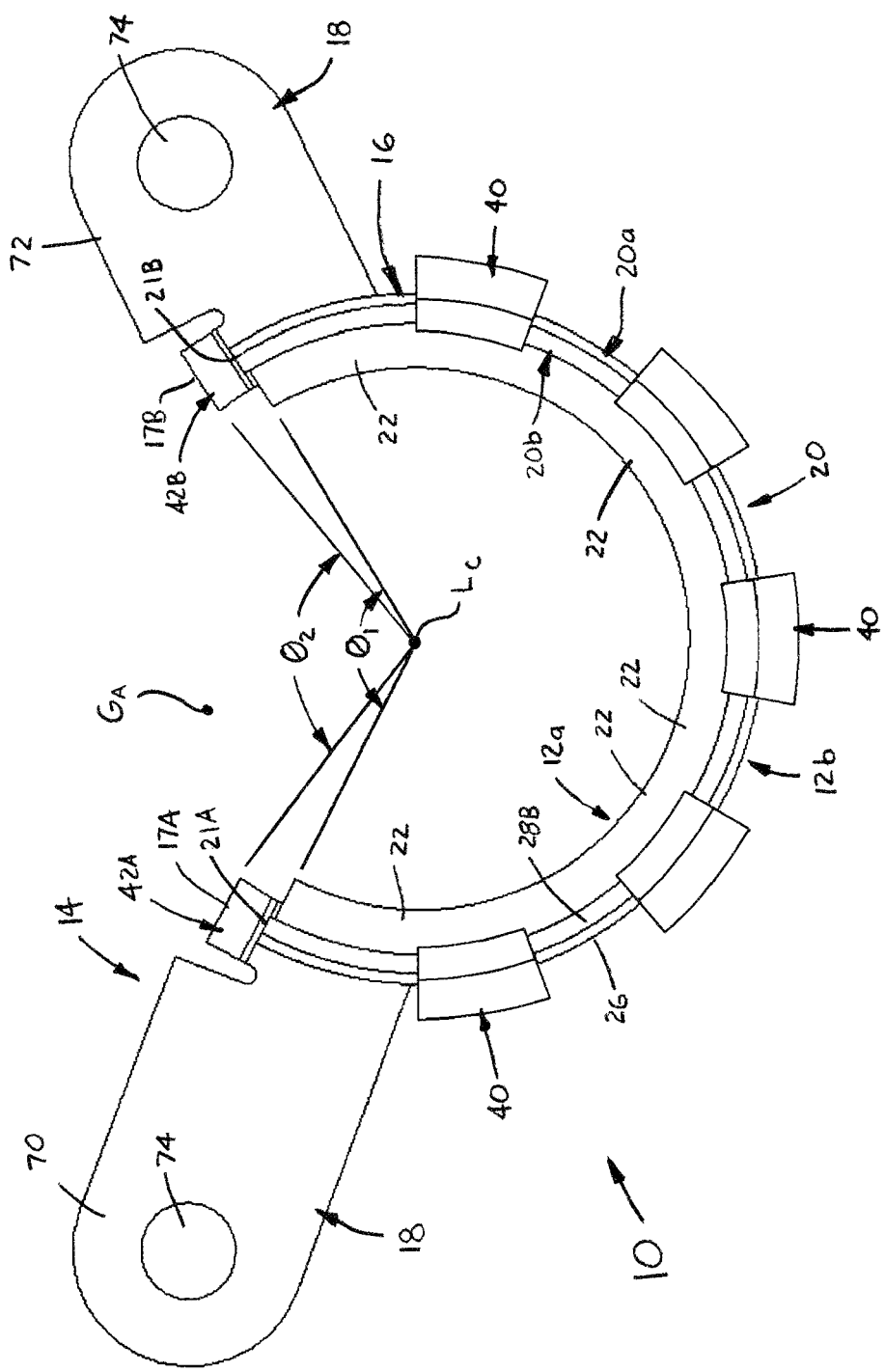
FIG. 5 is a front plan view of the first construction conductive assembly.
Figure 6:
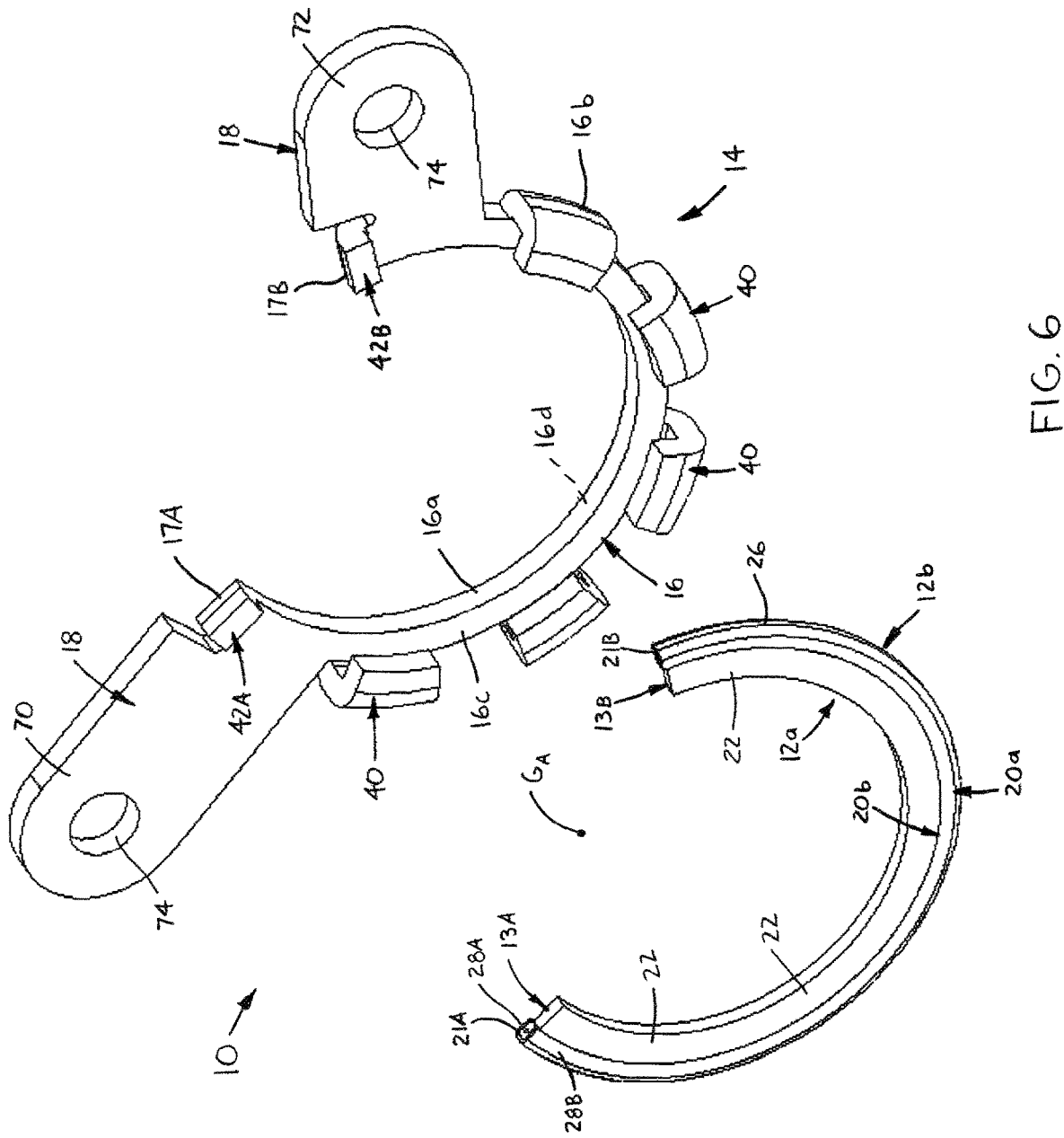
FIG. 6 is an exploded perspective view of the first construction conductive assembly.
Figure 7:
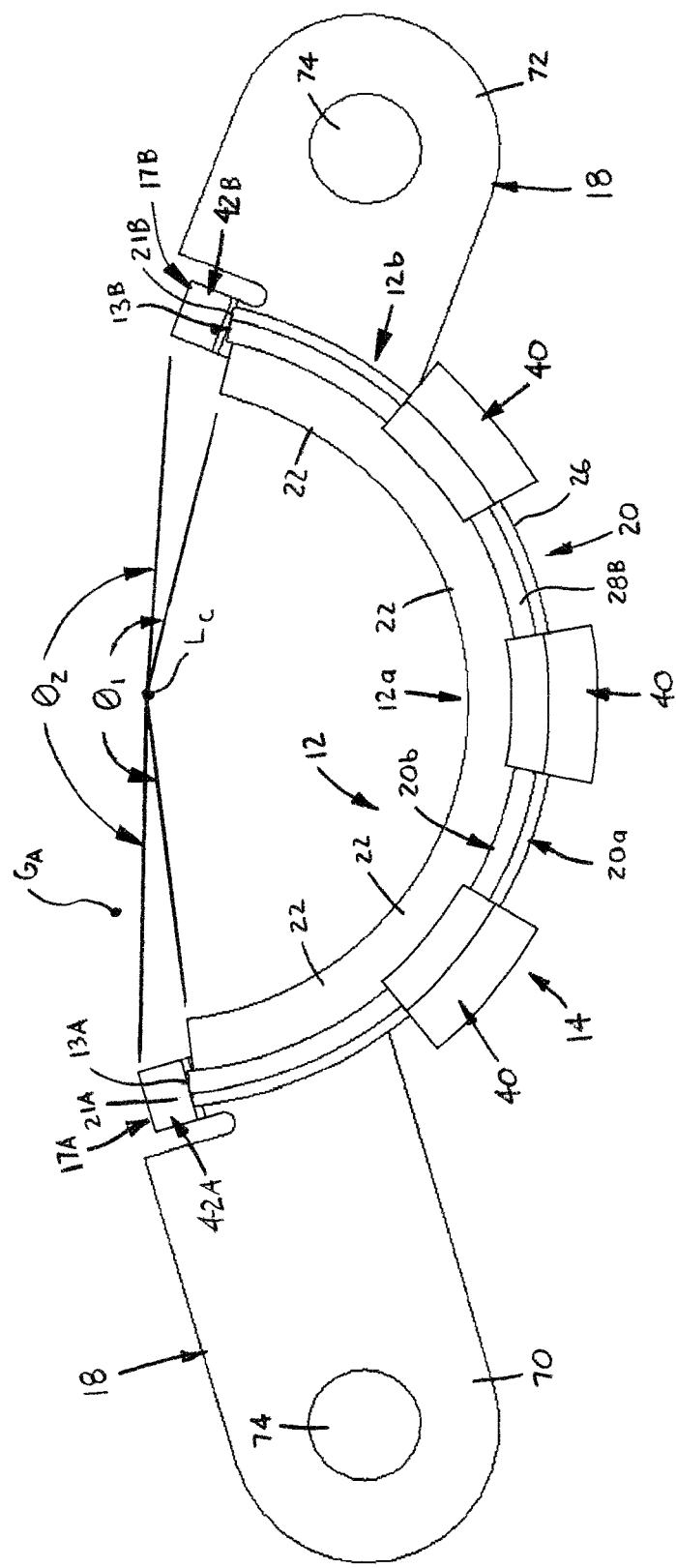
FIG. 7 is a front plan view of a modified version of the first construction conductive assembly.
Figure 8:
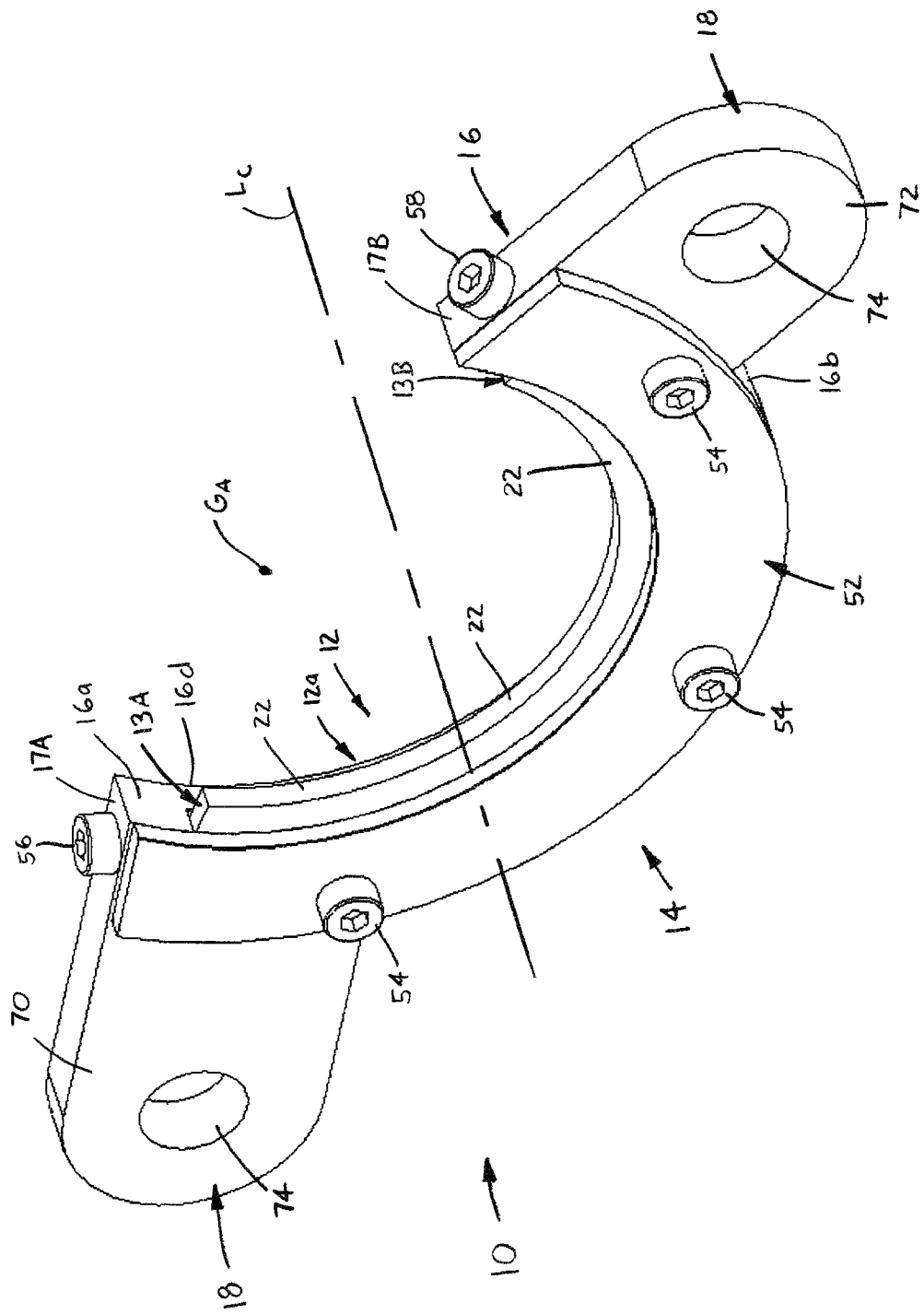
FIG. 8 is a perspective view of the second construction conductive assembly.
Figure 9:
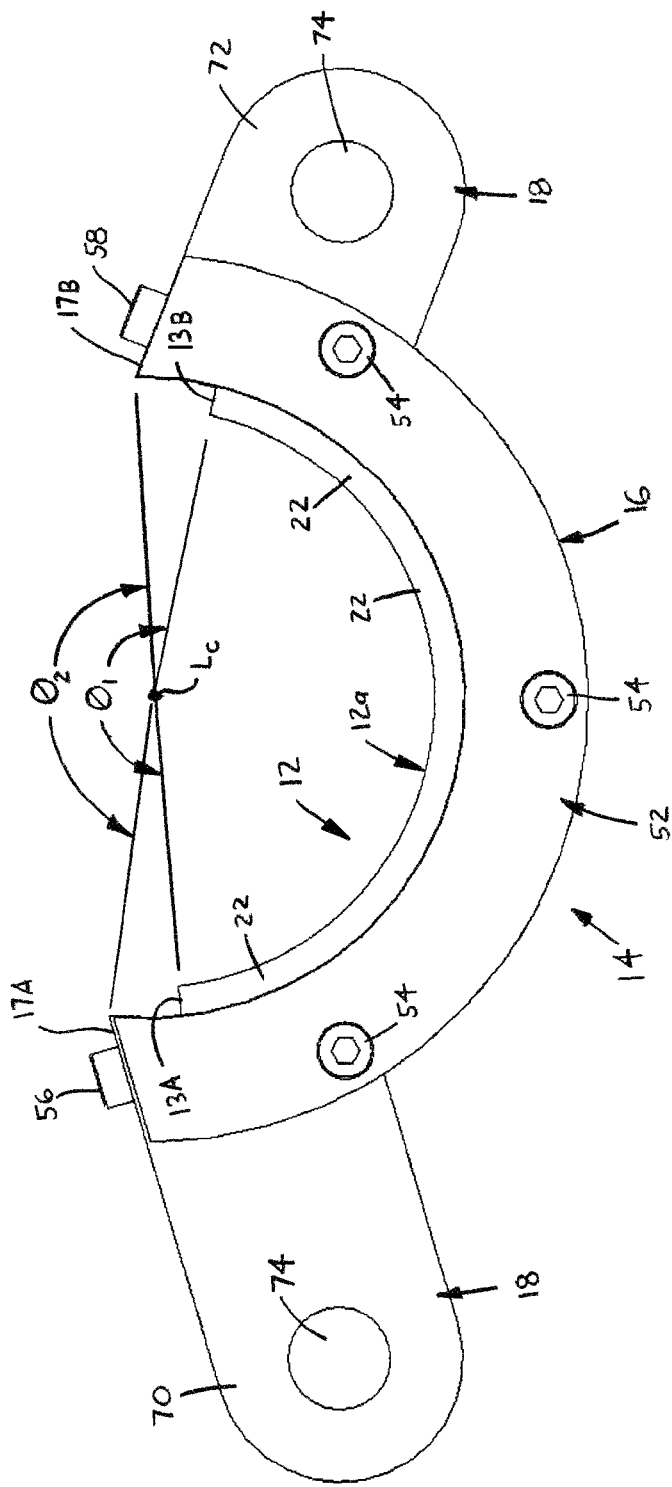
FIG. 9 is a front plan view of the second construction conductive assembly.
Figure 10:
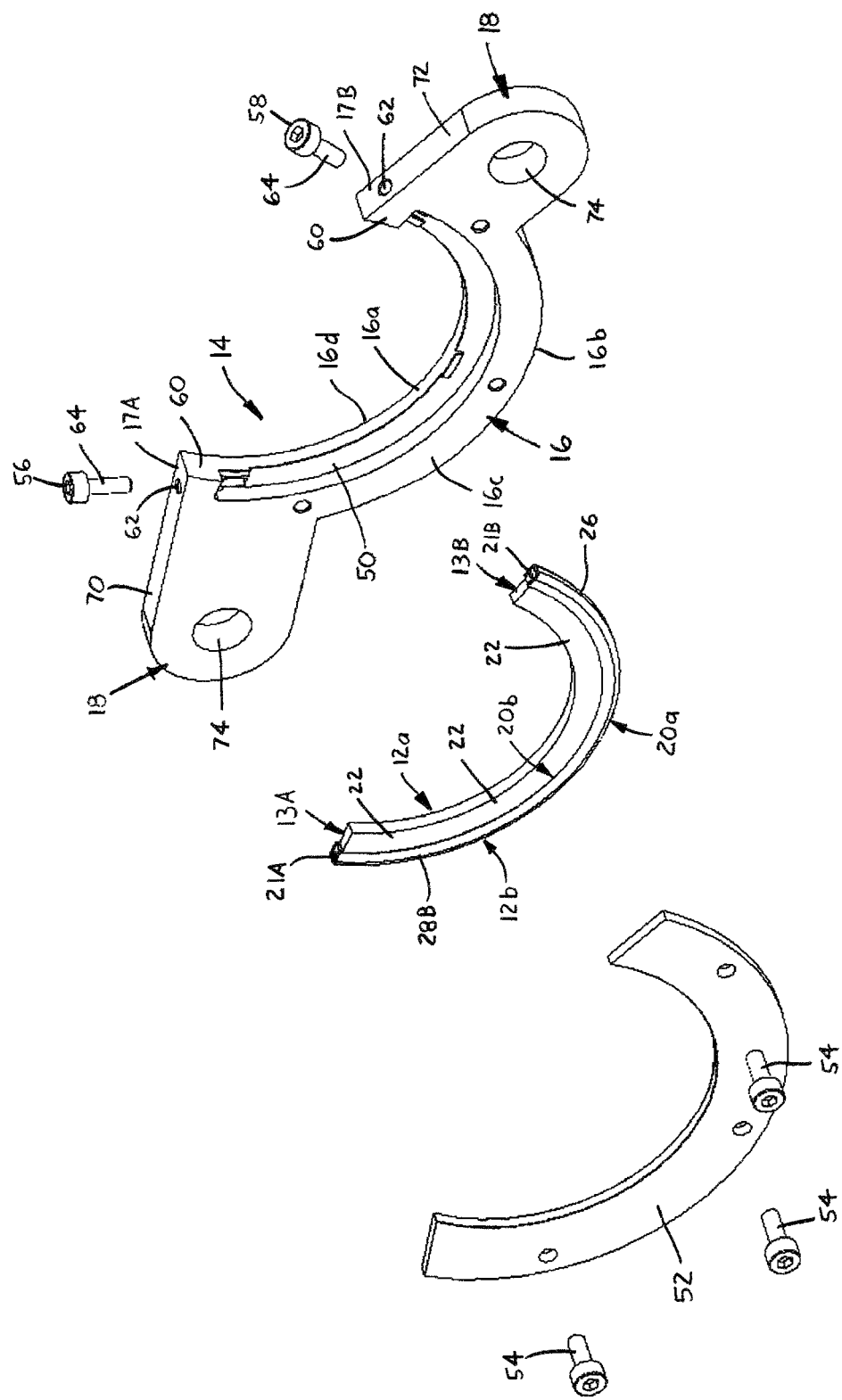
FIG. 10 is an exploded perspective view of the second construction conductive assembly.
Figure 11:
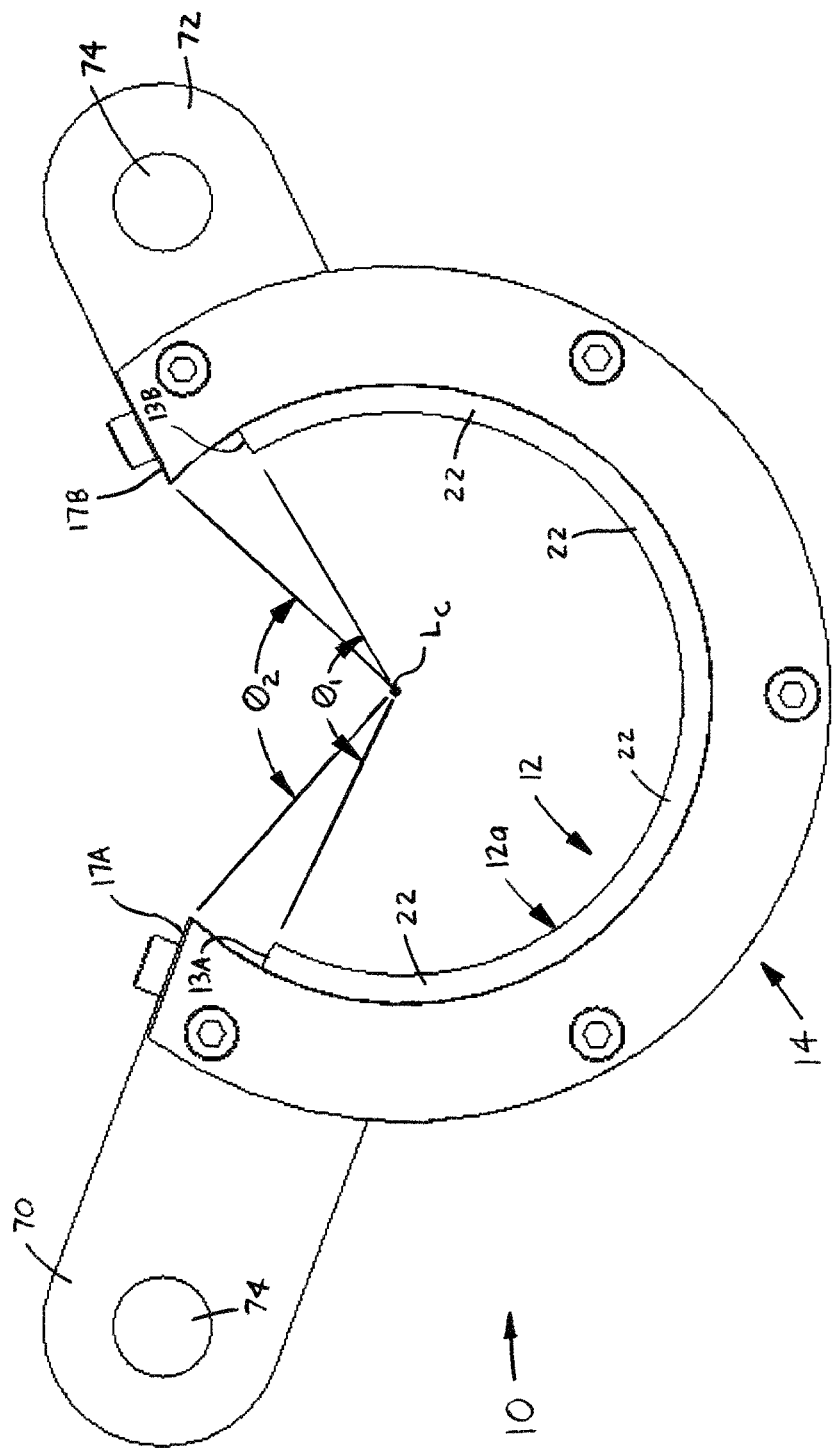
FIG. 11 is a front plan view of a modified version of the second construction conductive assembly.

Specifically, the arcuate conductor 12 has a centerline $L_C$, an inner radial end 12a engageable with the shaft 3 or the bearing inner ring 4, an outer radial end 12b and two circumferential ends 13A, 13B. The circumferential ends 13A, 13B of the conductor 12 are spaced circumferentially apart such that an arcuate gap $G_A$ is defined between the two ends 13A, 13B when the conductor 12 is installed about the shaft 3 or the bearing inner ring 2. Further, the two circumferential ends 13A, 13B define a gap angle $\theta_1$ about the centerline $L_C$, which has a value of at least thirty degrees (30°) and preferably between about ninety degrees (90°) and about two hundred degrees (200°), although the conductor 12 may be formed having any desired gap angle $\theta_1$. In any case, the arcuate gap $G_A$ is sized to provide a passage for fluid flow through the bearing 1 or clearance for a portion of the outer member 6 or the other member or component 8 (as shown in FIGS. 1 and 2) located proximal to or even installed within the outer member 6.

Further, the at least one conductive coupler 14 preferably includes an arcuate plate 16 having inner and outer radial ends 16a, 16b, opposing axial end surfaces 16c, 16d, two circumferential ends 17A, 17B, and at least one and preferably at least two mounting lugs 18, the arcuate conductor 12 being attached to the plate 16 as described below. The two circumferential ends 17A, 17B of the plate 16 are spaced circumferentially apart so as to define a radially outer portion of the arcuate clearance gap $G_A$ defined between the circumferential ends 13A, 13B of the conductor 12. The two circumferential ends 17A, 17B of the arcuate plate 16 define an angle $\theta_2$ about the centerline $L_C$, which preferably has a value of at least thirty degrees (30) and most preferably about the same value (but slightly lesser) as the value of the angle $\theta_1$ between the conductor ends 13A, 13B, as discussed below. Further, the one or more mounting lugs 18 are each attachable to the outer member 6 (FIG. 3B), the proximal machine component/member 8 (FIGS. 1 and 2) or to the bearing outer ring 4 (FIG. 3A) so as to connect the conductive assembly 10 thereto.

Although the at least one conductive coupler 14 preferably includes the arcuate plate 16, the coupler 14 may instead be formed as one or more separate mounting members (e.g., lugs, brackets, etc.) attached to the arcuate conductor 12 or integrally formed with the conductor 12. Although the conductive coupler(s) 14 is/are preferably formed to provide an outer portion of the clearance gap $G_A$, the coupler 14 may be provided by an entirely circular plate, or even a partially arcuate plate, block, etc., such that only the radially inner portion of the gap $G_A$ between the conductor circumferential ends 13A, 13B is provided. Thus, the at least one coupler 14 may be formed in any other appropriate manner that preferably provides an outer portion of the arcuate gap $G_A$, but in any case, enables the conductive assembly 10 to generally function as described herein.

With the basic structure above, the conductive assembly 10 provides a means to divert electric charge from passing through the bearing raceways $R_I$, $R_O$, and by providing the arcuate gap $G_A$, either a port for fluid flow through the bearing 1 or/and clearance space for portions of the outer member 6 or a member/component 8 installed proximal to or within the outer member 6. Such clearance space enables the conductive assembly 10 to be installed within an existing application which lacks the space necessary for utilization of a substantially circular conductive assembly. Further, when the circumferential ends 13A, 13B of the conductor 12 and the circumferential ends 17A, 17B of the preferred conductive plate 16 each define an angle $\theta_1$, $\theta_2$, respectively, greater than about one hundred eighty degrees (180°), as shown in FIGS. 7-10, the conductive assembly 10 may be installed about the shaft 3 in a radial direction, as opposed to being installed about an end (not shown) of the shaft 3 and displaced axially to a desired installation point. Having described the basic structure and functions above, these and other components of the present conductive assembly 10 are described in further detail below.

Referring to FIGS. 4-14, the conductor 12 preferably includes an outer, arcuate conductive retainer 20 and a plurality of conductive fibers 22 extending radially inwardly from the arcuate retainer 20 and configured to engage with the shaft 3 or inner ring 2, preferably with an interference (i.e., by bending of the fibers 22) of up to five millimeters (5 mm) diametrically. Specifically, the arcuate retainer 20 has a closed outer radial end 20a, an open inner radial end 20b, an annular channel 24 extending radially outwardly from the inner radial end 20b and two circumferential ends 21A, 21B providing the conductor circumferential ends 13A, 13b, respectively. Preferably, the arcuate retainer 20 includes an outer base wall 26 and a pair of sidewalls 28A, 28B extending radially inwardly from the base wall 26 and defining the circumferential channel 24. Also, the arcuate retainer 20 is preferably formed of a conductive metallic material, most preferably aluminum, but may be formed of another metallic material such as steel or copper, a conductive polymeric material, or any other electrically conductive material.

Further, the plurality of conductive fibers 22 are spaced circumferentially about the centerline $L_C$ of the conductor 12 and are preferably evenly distributed along the entire arcuate perimeter (not indicated) between the circumferential ends 21A, 2B of the arcuate retainer 20. Each conductive fiber 22 has an outer radial end 22a disposed within the channel 24 of the retainer 20 and at least one inner radial end 22b engageable with the shaft 3 or the bearing inner ring 2. Preferably, the arcuate conductor 14 further includes an arcuate conductive wire 30 (FIGS. 12 and 13) disposed within the retainer channel 24. Each conductive fiber 22 is bent about the arcuate wire 30 such that each fiber 22 has two inner radial ends 22b engageable with the shaft 3, or the bearing inner ring 2, and is generally U-shaped or V-shaped.

Figure 12:
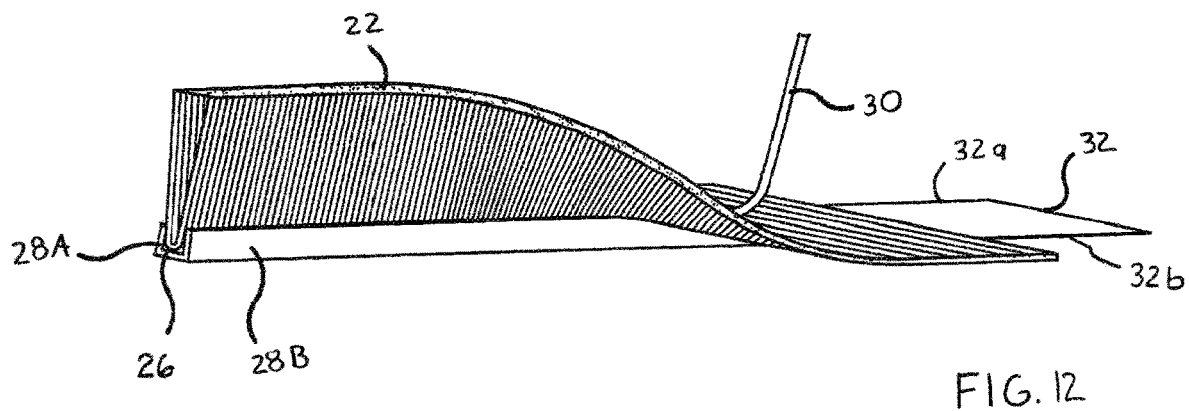
FIG. 12 is a perspective view depicting certain steps in fabricating a preferred conductor.
Figure 13:
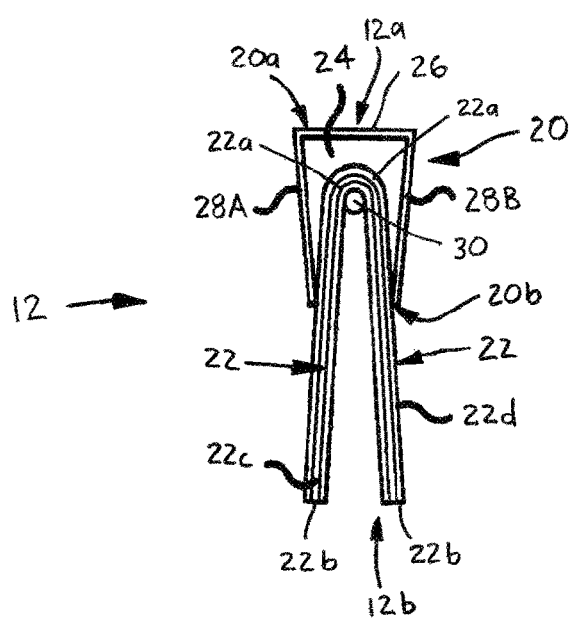
FIG. 13 is an axial cross-sectional view of the preferred conductor.
Figure 14:
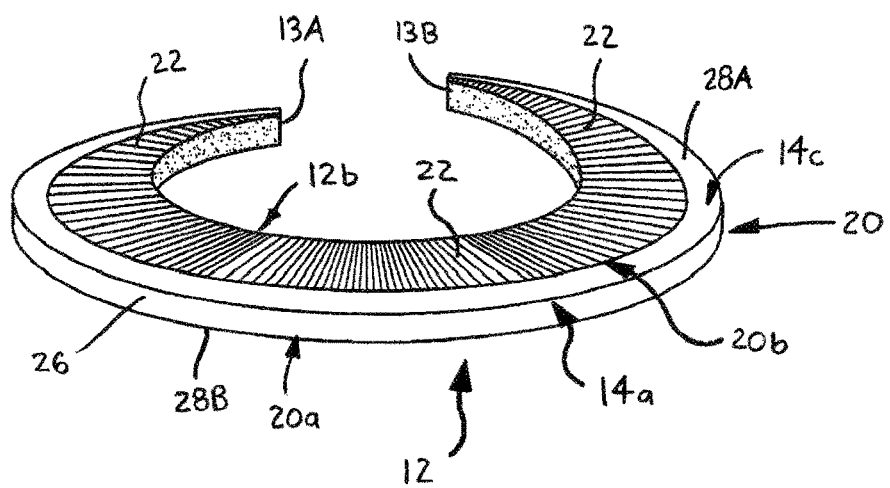
FIG. 14 is a perspective view of the preferred conductor.

Referring particularly to FIGS. 12-14, the arcuate conductor 12 is preferably formed by distributing the plurality of conductive fibers 22 along a rectangular conductive plate 32, such that each fiber 22 extends over both elongated edges 32a, 32b of the plate 32, as shown in FIG. 12. The wire 30 is then positioned to extend longitudinally across all of the conductive fibers 22 and then elongated edge portions of the plate 32 are bent upwardly to form the two sidewalls 28A, 28B, fold all of the fibers 22 around the wire 30 and form the channel 24. Preferably, the two sidewalls 28A, 28B of the arcuate retainer 20 are angled toward each other such that the plurality of conductive fibers 22 are "pinched" by the sidewalls 28A, 28B, as shown in FIG. 13. Thereby, the arcuate wire 30 and the outer ends 22a of the fibers 22 are retained within the annular channel 24, and a plurality of conductive paths extend from the plurality of fiber legs 22c, 22d and to the two sidewalls 28A, 28B and the base wall 26, and thereafter through the mounting ring 12.

Finally the elongated plate 32 is bent to form an arcuate shape having an inside diameter (not indicated) sized to engage with the outer surface of the shaft 3. Preferably, each conductive fiber 22 is formed of carbon but may alternatively formed of a metallic material (e.g., copper, aluminum), a conductive polymeric material or any other appropriate material. Although the conductor 14 preferably includes the arcuate retainer 20 and the plurality of conductive fibers 22, the conductor 20 may be formed in any other appropriate manner. For example, the conductor 14 may be formed as an arcuate solid member (not shown) formed of a flexible, electrically conductive polymeric material, graphite or another electrically conductive material.

Referring now to FIGS. 4-7, in a first preferred construction, the arcuate retainer 20 of the conductor 12 is disposed against the plate end surface 16c (FIG. 6) and the coupler plate 16 further has a plurality of circumferentially spaced retainer tabs 40. Each retainer tab 40 is bent radially inwardly to sandwich a portion of the retainer 20 between the retainer tab 40 and the plate end surface 16c, so as to thereby secure the conductor 12 to the arcuate plate 16. Further, the arcuate plate 16 further includes first and second fixing tabs 42A, 42B each bent axially to engage with a separate one of the circumferential ends 21A, 21B of the conductor arcuate retainer 20 after the retainer 20 is sandwiched by the mounting tabs 40. As such, the fixing tabs 42A, 42B function to prevent angular displacement of the conductor 12 relative to the coupler arcuate plate 16.

Referring to FIGS. 8-11, in a second preferred construction, the arcuate plate 16 providing the at least one coupler 14 has a partially circular groove 50 (FIG. 10) extending into one axial end 16c and an arcuate cover 52 attachable to the plate axial end 16c, preferably by a plurality of fasteners 54. With this structure, the arcuate retainer 20 of the conductor 12 is disposed within the partially circular groove 40 such that the plurality of conductive fibers 20 extend radially inwardly from the radial inner end 16b of the plate 16. The arcuate cover 52 is thereafter attached to the arcuate plate 16, i.e., by the fasteners 54, so as to retain the arcuate retainer 20 within the groove 40. Further, the conductive coupler 20 preferably includes first and second fixing members 56, 58 each movably coupled with the arcuate plate 16 and having an end 56a, 58a, respectively, engageable with a separate one of the circumferential ends 21A, 21B, respectively of the retainer 20. The engagement of the fixing members 56, 58 with the retainer ends 21A, 21B prevents angular displacement of the conductor 12 relative to the plate 16.

More specifically, the arcuate plate 16 preferably has two block portions 60 each located adjacent to a separate end 50a, 50b of the partially circular groove 50 and a threaded hole 62 extends through each block portion 60 between one circumferential end 17A or 17B of the plate 16 and the adjacent end 50a, 50b, respectively of the groove 50. With this structure, each movable fixing member 56, 58 preferably includes a threaded rod 64 threadedly engaged with the threaded hole 62 of a separate one block portions 60. As such, each threaded rod 64 is advanceable through the hole 62 to increase the force exerted on the adjacent circumferential end 21A or 21B of the retainer 20, and alternatively withdrawable to reduce the force exerted on the retainer circumferential ends 21A, 21B.

Referring now to FIGS. 4-11, in both preferred plate constructions, the at least one mounting lug 18 of the arcuate plate 16 preferably includes two mounting lugs 18 as discussed above. Specifically, a first lug 70 extends radially outwardly from the plate 16 adjacent to one circumferential end 17A of the plate 16 and a second mounting lug 72 extends radially outwardly from the plate 16 adjacent to the other plate circumferential end 17B. Each mounting lug 70, 72 has an opening 74 for receiving a fastener 76 (FIG. 1) to removably couple the lug 70 or 72 to the outer member 6, the other member/component 8 or the bearing outer ring 4, and to thus secure the conductive assembly 10 thereto.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

I claim:

1. An electrically conductive assembly for preventing current flow through the raceways of a bearing having an inner ring disposed about a shaft and an outer ring disposed within a bore of an outer member, the shaft or the outer member being rotatable about a central axis through the shaft, the conductive assembly comprising:
an arcuate conductor having a centerline, an inner radial end engageable with the shaft or the bearing inner ring, an outer radial end and two circumferential ends spaced circumferentially apart such that an arcuate gap is defined between the two ends when the conductor is installed about the shaft or the bearing inner ring, the two circumferential ends defining a gap angle about the centerline, the gap angle having a value of at least thirty degrees; and
at least one conductive coupler configured to attach the conductor to the outer member, another member or the bearing outer ring such that an electrically conductive path extends through the conductor and the at least one coupler.

2. The conductive assembly as recited in claim 1 wherein the gap angle has a value of between about ninety degrees and about two hundred degrees.

3. The conductive assembly as recited in claim 1 wherein the arcuate gap is sized to provide a passage for fluid flow through the bearing or clearance for a portion of the outer member or another member located proximal to or installed within the outer member.

4. The conductive assembly as recited in claim 1 wherein the conductor includes:
an arcuate conductive retainer having an outer radial end, an inner radial end and an annular channel extending radially outwardly from the inner radial end; and
a plurality of conductive fibers spaced circumferentially about the centerline, each fiber having an outer radial end disposed within the channel of the retainer and at least one inner radial end engageable with the shaft or the bearing inner ring.

5. The conductive assembly as recited in claim 4 wherein the conductor further includes an arcuate wire disposed within the channel of the conductive retainer and each conductive fiber is bent about the arcuate wire such that each fiber has two inner radial ends engageable with the shaft or the bearing inner ring.

6. The conductive assembly as recited in claim 4 wherein the at least one conductive coupler includes an arcuate plate having two circumferential ends, the two circumferential ends being spaced circumferentially apart so as to define an outer portion of the arcuate gap defined between the circumferential ends of the conductor, and at least one mounting lug attachable to the outer member, the other member or the bearing outer ring, the arcuate retainer of the conductor being attached to the arcuate plate.

7. The conductive assembly as recited in claim 6 wherein the two circumferential ends of the arcuate plate define an angle with respect to the central axis, the angle having a value of at least thirty degrees.

8. The conductive assembly as recited in claim 6 wherein the arcuate plate has a partially circular groove, the arcuate retainer of the conductor being disposed within the partially circular groove, and an arcuate cover attached to the arcuate plate so as to retain the arcuate retainer within the groove.

9. The conductive assembly as recited in claim 8 wherein the retainer of the conductor has two circumferential ends and the at least one conductive coupler further includes first and second fixing members each movably coupled with the arcuate plate and having an end engageable with a separate one of the circumferential ends of the retainer to prevent angular displacement of the conductor relative to the plate.

10. The conductive assembly as recited in claim 6 wherein the arcuate plate has an axial end surface, the retainer of the conductor being disposable against the plate end surface, and a plurality of circumferentially spaced retainer tabs each bent radially inwardly to sandwich a portion of the retainer between the retainer tab and the plate end surface so as to secure the conductor to the arcuate plate.

11. The conductive assembly as recited in claim 10 wherein the arcuate retainer of the conductor has two circumferential ends and the arcuate plate of the conductive coupler further includes first and second fixing tabs each bent axially to engage with a separate one of the circumferential ends of the arcuate retainer after the retainer is sandwiched by the mounting tabs so as to prevent angular displacement of the conductor relative to the arcuate plate.

12. The conductive assembly as recited in claim 6 wherein the at least one mounting lug of the arcuate plate includes a first lug extending radially outwardly from the plate adjacent to one of the two circumferential ends of the plate and a second mounting lug extending radially outwardly from the plate adjacent to the other one of the two circumferential ends of the plate, each mounting lug having an opening for receiving a fastener to removably couple the lug to the outer member or the bearing outer ring.

13. An electrically conductive assembly for preventing current flow through the raceways of a bearing having an inner ring disposed about a shaft and an outer ring disposed within a bore of an outer member, the shaft or the outer member being rotatable about a central axis through the shaft, the conductive assembly comprising:
an arcuate conductor having a centerline and including an arcuate conductive retainer, the retainer having an outer base wall and a pair of sidewalls extending radially inwardly from the base wall so as to define an arcuate channel and two circumferential ends spaced circumferentially apart such that an arcuate gap is defined between the two ends when the conductor is installed about the shaft or the bearing inner ring, the two circumferential ends of the retainer defining a gap angle about the centerline, the gap angle having a value of at least thirty degrees, and a plurality of conductive fibers spaced circumferentially about the centerline, each fiber having an outer radial end disposed within the channel of the retainer and at least one inner radial end engageable with the shaft or the bearing inner ring; and
at least one conductive coupler configured to attach the conductor to the outer member, another member or the bearing outer ring such that a conductive path extends through the conductor and the at least one coupler.

14. The conductive assembly as recited in claim 13 wherein the conductor further includes an arcuate wire disposed within the channel of the conductive retainer and each conductive fiber is bent about the arcuate wire such that each fiber has two inner radial ends engageable with the shaft or the bearing inner ring.

15. The conductive assembly as recited in claim 13 wherein the at least one conductive coupler includes an arcuate plate having two circumferential ends, the two circumferential ends being spaced circumferentially apart so as to define an outer arcuate clearance gap spaced radially outwardly from and continuous with the arcuate gap defined between the circumferential ends of the conductor, the two circumferential ends of the arcuate plate defining an angle with respect to the central axis, the angle having a value of at least thirty degrees, and at least one mounting lug attachable to the outer member, the other member or the bearing outer ring, the arcuate retainer of the conductor being attached to the arcuate plate.

16. The conductive assembly as recited in claim 15 wherein one of:
   the arcuate plate has a partially circular groove, the arcuate retainer of the conductor being disposed within the partially circular groove, an arcuate cover attached to the arcuate plate so as to retain the arcuate retainer within the groove; and
   the arcuate plate has an axial end surface, the retainer of the conductor being disposable against the plate end surface, and a plurality of circumferentially spaced retainer tabs each bent radially inwardly to sandwich a portion of the retainer between the retainer tab and the plate end surface so as to secure the conductor to the arcuate plate.

17. An electrically conductive assembly for preventing current flow through the raceways of a bearing having an inner ring disposed about a shaft and an outer ring disposed within a bore of an outer member, the shaft or the outer member being rotatable about a central axis through the shaft, the conductive assembly comprising:
   an arcuate conductor having a centerline and including an arcuate conductive retainer, the retainer having an outer base wall and a pair of sidewalls extending radially inwardly from the base wall so as to define an arcuate channel and two circumferential ends spaced circumferentially apart such that an arcuate gap is defined between the two ends, the two circumferential ends of the retainer defining a gap angle about the centerline, the gap angle having a value of at least thirty degrees, and a plurality of conductive fibers spaced circumferentially about the centerline, each fiber having an outer radial end disposed within the channel of the retainer and at least one inner radial end engageable with the shaft or the bearing inner ring; and
   a conductive coupler including an arcuate plate having two circumferential ends, the two circumferential ends being spaced circumferentially apart so as to define a radially outer portion of the arcuate gap defined between the circumferential ends of the conductor, the two circumferential ends of the arcuate plate defining an outer gap angle about the central axis, the outer gap angle having a value of at least thirty degrees, and at least one mounting lug attachable to the outer member, another member or the bearing outer ring, the arcuate retainer of the conductor being attached to the arcuate plate such that a conductive path extends through the conductor and the conductive coupler.

18. The conductive assembly as recited in claim 17 wherein the conductor further includes an arcuate wire disposed within the channel of the conductive retainer and each conductive fiber is bent about the arcuate wire such that each fiber has two inner radial ends engageable with the shaft or the bearing inner ring.

19. The conductive assembly as recited in claim 17 wherein one of:
   the arcuate plate has a partially circular groove, the arcuate retainer of the conductor being disposed within the partially circular groove, an arcuate cover attached to the arcuate plate so as to retain the arcuate retainer within the groove; and
   the arcuate plate has an axial end surface, the retainer of the conductor being disposable against the plate end surface, and a plurality of circumferentially spaced retainer tabs each bent radially inwardly to sandwich a portion of the retainer between the retainer tab and the plate end surface so as to secure the conductor to the arcuate plate.

20. The conductive assembly as recited in claim 19 wherein conductive coupler further includes one of:
   first and second fixing members each movably coupled with the arcuate plate and having an end engageable with a separate one of the circumferential ends of the retainer to prevent angular displacement of the conductor relative to the plate; and
   first and second fixing tabs each bent axially from a remainder of the plate to engage with a separate one of the circumferential ends of the arcuate retainer after the retainer is sandwiched by the mounting tabs so as to prevent angular displacement of the conductor relative to the arcuate plate.

\* \* \* \* \*